(12) United States Patent
Kurokawa

(10) Patent No.: US 9,566,998 B2
(45) Date of Patent: Feb. 14, 2017

(54) INNER SHAFT FOR EXTENDABLE AND CONTRACTIBLE SHAFT AND MANUFACTURING METHOD THEREOF

(71) Applicant: NSK LTD., Tokyo (JP)

(72) Inventor: Yoshifumi Kurokawa, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/419,792

(22) PCT Filed: May 23, 2014

(86) PCT No.: PCT/JP2014/063685
§ 371 (c)(1),
(2) Date: Feb. 5, 2015

(87) PCT Pub. No.: WO2014/192653
PCT Pub. Date: Dec. 4, 2014

(65) Prior Publication Data
US 2015/0210309 A1    Jul. 30, 2015

(30) Foreign Application Priority Data

May 27, 2013    (JP) .................................. 2013-110619
Apr. 11, 2014   (JP) .................................. 2014-081738

(51) Int. Cl.
*F16C 3/03*     (2006.01)
*B62D 1/20*     (2006.01)
(Continued)

(52) U.S. Cl.
CPC . *B62D 1/20* (2013.01); *B62D 1/16* (2013.01); *F16D 1/02* (2013.01); *F16D 3/06* (2013.01);
(Continued)

(58) Field of Classification Search
CPC ............... B62D 1/16; B62D 1/20; F16D 1/02; F16D 1/10; F16D 3/06; F16D 2001/103; F16D 2250/0046; F16D 2300/10; F16C 1/02
(Continued)

(56) References Cited

U.S. PATENT DOCUMENTS 2,653,840 A * 9/1953 Bitzer .................... A01K 87/02
                                            403/359.6 X
RE27,068 E * 2/1971 Groves et al. ............ F16D 3/06
                                            464/162
(Continued)

FOREIGN PATENT DOCUMENTS

EP    2 687 741         1/2014
JP    58-77913 A  *  5/1983  ................. 403/359.6
(Continued)

OTHER PUBLICATIONS

International Search Report and Written Opinion dated Aug. 19, 2014, from the corresponding PCT/JP2014/063685.

*Primary Examiner* — Gregory Binda
(74) *Attorney, Agent, or Firm* — Katten Muchin Rosenman LLP

(57) ABSTRACT

Provided is construction and a manufacturing method of an inner shaft for an extendable and contractible shaft for which finishing for forming a synthetic resin coating layer 19a on the outer-circumferential surface of a male spline section 14b is performed, while at the same time an increase in weight thereof is suppressed. A concave groove 22 that extends in the axial direction is provided on the outer-circumferential surface of the male spline section in a state so as to be continuous in the axial direction with one male spline groove 23 of the male spline grooves 23 of the male spline section 14b. A portion of the concave groove 22 that is separated in the axial direction from the male spline (Continued)

section 14*b* is used to perform phase alignment of a cutting tool for performing a finishing process of a coating layer 19*a* and unevenness in the circumferential direction of the male spline section 14*b*.

9 Claims, 10 Drawing Sheets

(51) Int. Cl.
  *B62D 1/16* (2006.01)
  *F16D 3/06* (2006.01)
  *F16D 1/02* (2006.01)
  *F16D 1/10* (2006.01)

(52) U.S. Cl.
  CPC ........... *F16D 1/10* (2013.01); *F16D 2001/103* (2013.01); *F16D 2250/0046* (2013.01); *F16D 2300/10* (2013.01)

(58) Field of Classification Search
  USPC ........ 464/162, 182; 403/109.1, 359.1–359.6; 409/1
  See application file for complete search history.

(56) References Cited

U.S. PATENT DOCUMENTS

| | | | | |
|---|---|---|---|---|
| 5,830,071 A | * | 11/1998 | Castellon | ................... F16C 3/03 403/359.5 |
| 8,066,573 B2 | * | 11/2011 | Wagner | ..................... F16C 3/03 464/162 X |
| 2005/0044980 A1 | | 3/2005 | Minamoto et al. | |

FOREIGN PATENT DOCUMENTS

| | | |
|---|---|---|
| JP | 3-204417 A | 9/1991 |
| JP | 11-148853 A | 6/1999 |
| JP | 2002-263951 A | 9/2002 |
| JP | 2005-42761 A | 2/2005 |
| JP | 2005-203303 A | 7/2005 |
| JP | 2008-226622 A | 9/2008 |
| JP | 2010-70230 A | 4/2010 |
| JP | 2011-173463 A | 9/2011 |
| JP | 2011-173464 A | 9/2011 |
| JP | 2012-040949 A | 3/2012 |
| JP | 2012-197838 A | 10/2012 |

* cited by examiner

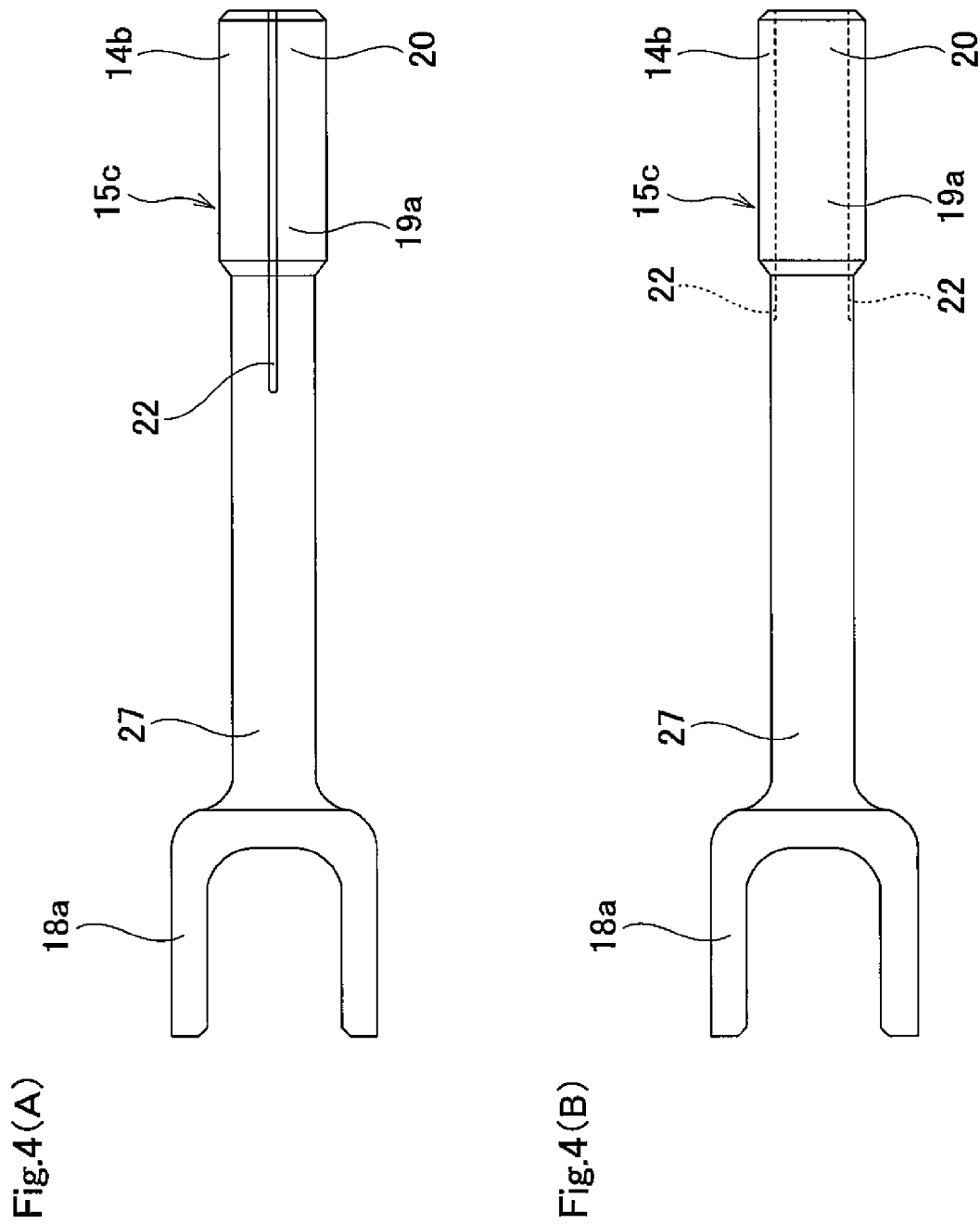

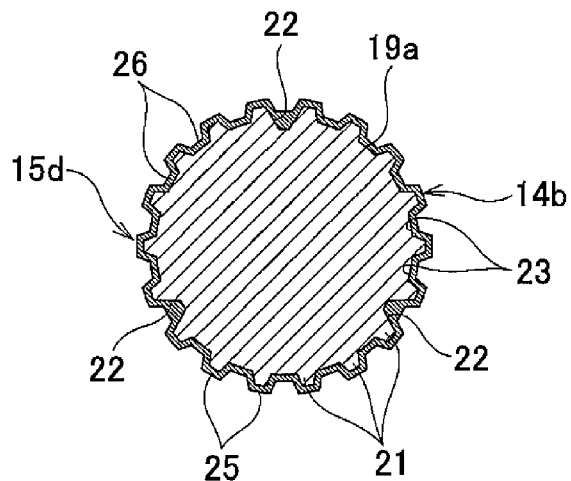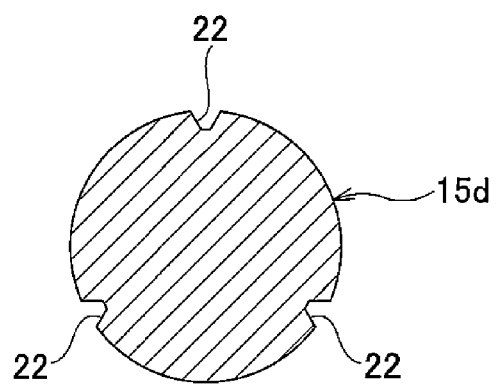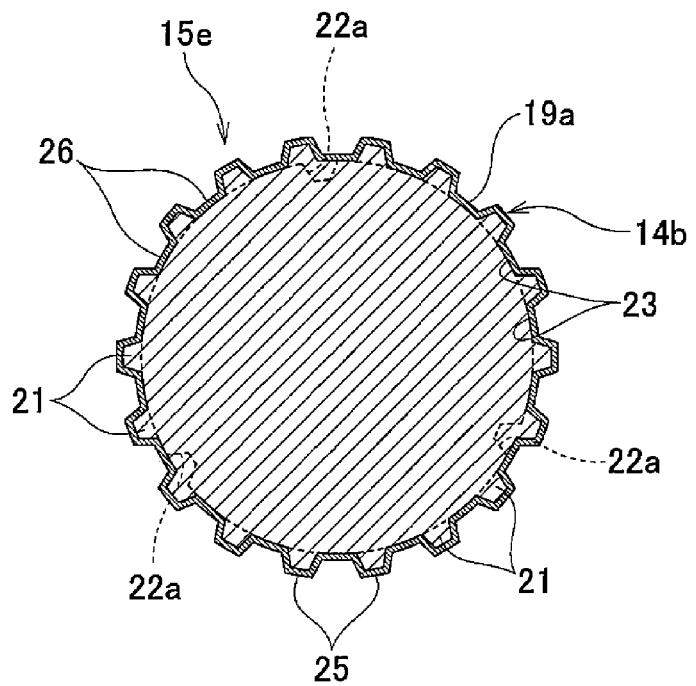

INNER SHAFT FOR EXTENDABLE AND CONTRACTIBLE SHAFT AND MANUFACTURING METHOD THEREOF

TECHNICAL FIELD

The present invention relates to an inner shaft for an extendable and contractible shaft such as an extendable and contractible shaft for a steering apparatus that is used in an automobile steering apparatus.

BACKGROUND ART

As illustrated in FIG. 9, an automobile steering apparatus is constructed so that the movement of a steering wheel 1 is transmitted to a steering gear 2. More specifically, the movement of the steering wheel 1 is transmitted to an input shaft 6 of the steering gear 2 by way of a steering shaft 3, a universal joint 4a, an intermediate shaft 5, and a universal joint 4b; and the steering gear 2 applies a desired steering angle to the steered wheels by pushing or pulling tie rods 7. In this steering apparatus, an electric-powered power steering apparatus is assembled such that an electric motor 8 applies an auxiliary force to the steering shaft 3 according to a force that is applied to the steering wheel 1 by the driver.

In order to be able to adjust the forward/backward position of the steering wheel 1 according to the size and driving posture of the driver, this steering apparatus has a mechanism that causes a steering shaft 3 and a steering column 9 that rotatably supports the steering shaft 3 to extend or contract. More specifically, the steering shaft 3 is constructed by a so-called telescopic steering shaft that combines an outer shaft 10 and an inner shaft 11 by a spline joint so that extension and contraction is possible, and so that torque can be transmitted. Moreover, the steering column 9 is constructed by an outer column 12 and an inner column 13 that are combined so as to be able to freely extend or contract.

The intermediate shaft 5 also has extendable and contractible construction in order to prevent the steering wheel 1 from being pushed to the driver's side during a collision accident. FIG. 10 illustrates an example of construction of a conventional intermediate shaft. The intermediate shaft has an inner shaft 15 that is provided with a male spline section 14 around the outer-circumferential surface of the front end section thereof, and a cylindrical outer shaft 17 on which a female spline section 16 is formed around the inner-circumferential surface thereof so that the male spline section 14 can be freely inserted therein. By fitting the male spline section 14 into the female spline section 16 with a spline fit, the inner shaft 15 and outer shaft 17 are combined so as to be able to freely extend or contract. The base-end sections of one of the yokes 18a, 18b of the universal joints 4a, 4b are welded and fastened to the base-end sections of the inner shaft 15 and outer shaft 17.

As illustrated in FIG. 10, the intermediate shaft 5 is such that normally the male spline section 14 on the front-end side of the inner shaft 15 is located in the portion near the rear end of the female spline section 16 of the outer shaft 17. When the front section of the vehicle is pushed and crushed and the steering gear 2 is pushed toward the rear due to a collision accident (primary collision), the entire length of the intermediate shaft 5 contracts by the inner shaft 15 (male spline section 14) staying in the original position as is and the outer shaft 17 moving toward the rear, so that the male spline 14 enters the innermost section of the female spline section 16. With this kind of construction, even though the steering gear 2 is displaced toward the rear, the steering wheel 1 is prevented from moving toward the rear and being pushed toward the driver's side, so it is possible to protect the driver during a primary collision. During a secondary collision, the entire length of the steering shaft 3 contracts, which makes it possible to protect the driver from colliding with the steering wheel 1.

For an extendable and contractible shaft for a steering apparatus such as an intermediate shaft 5 and steering shaft 3, (1) a function for allowing torque to be transmitted during steering without any looseness even though there is backlash in the engaging section between the outer shaft and the inner shaft, and (2) a function that allows the shaft to extend or contract with a small force when extending or contracting the shaft are desired. Therefore, a synthetic resin coating layer that slides easily (has a low coefficient of friction) is provided on at least one of the outer-circumferential surfaces of the male spline section of the inner shaft and inner-circumferential surface of the female spline section of the outer shaft as disclosed in JP 2011-173464 (A), JP 2005-042761 (A), JP 2012-040949 (A) and the like.

When providing a coating layer on the outer-circumferential surface of the male spline section of the inner shaft, a resin layer is formed by forming a synthetic resin coating on the outer-circumferential surface of the male spline section, and then the excess portion is removed to make the film thickness of the resin layer uniform, and a finishing process is performed in order to improve the surface roughness. When performing the finishing process, it is important that the phase of the unevenness in the circumferential direction of the male spline section and the phase in the circumferential direction of the cutting tool such as a shaping cutter, broach or the like precisely match. When the shift in the phases in the circumferential direction of the male spline and cutting tool is large, there is a possibility that the thickness in the circumferential direction of the coating layer becomes uneven.

As illustrated in FIG. 11, in order to align the phases in the circumferential direction of the male spline section and cutting tool, the overall length of the male spline section 14a can be made to be long, and the male spline section 14a can be provided up to the portion where there is no engagement with the female spline section 16 of the outer shaft 17. In other words, when performing the finishing process after a resin layer has been formed on the tip-end section and intermediate section (sections other than the portion near the base-end section) of the outer-circumferential surface of the male spline section 14a, the phases in the circumferential direction of the male spline section 14a and the cutting tool are aligned by the portion near the base-end section of the male spline section 14a that is not covered by the resin layer. As a result, it is possible to form a synthetic resin coating layer 19 that has a uniform thickness and good surface roughness on the outer-circumferential surface of the portion of the male spline section 14a except for the portion near the base end. However, in the construction illustrated in FIG. 11, the male spline section 14a is provided up to a portion where there is no engagement with the female spline section 16, so the weight of the inner shaft 15a increases.

JP 2011-173464 (A) discloses technology in which a tapered section is provided on the tip-end section of the male spline teeth of the male spline section so that the thickness and depth of the male spline teeth become smaller going toward the tip-end edge, and the spline shaft having this kind of male spline section is pushed inside the broach in a state in which relative rotation in the circumferential direction is possible, after which a finishing process is performed on the resin layer. In this case, the male spline section is guided by engagement between the tapered section and the uneven section that is formed on the inner-circumferential surface of the broach, and it is possible to align the phases in the circumferential direction of the uneven section in the circumferential direction of the male spline section and the uneven section that is formed on the inner-circumferential surface of the broach. However, alignment of the phases in the circumferential direction of the male spline section and broach is performed by using the tapered sections in a state in which a resin layer has been formed on the outer-circumferential surface of the tapered section of the male spline section, so there is a possibility that this phase alignment will not be performed precisely. Moreover, the tapered section of the male spline section does not engage with the female spline section after completion and is essentially an unnecessary portion, so the weight of the inner shaft further increases by the amount where the tapered section is formed.

RELATED LITERATURE

Patent Literature

[Patent Literature 1] JP 2011-173464 (A)
[Patent Literature 2] JP 2005-042761 (A)
[Patent Literature 3] JP 2012-040949 (A)

SUMMARY OF INVENTION

Problem to be Solved by Invention

Taking into consideration the situation described above, the object of the present invention is to provide construction of an extendable and contractible inner shaft and production method thereof that makes it possible to easily align the phases in the circumferential direction of the male spline section and cutting tool during a finishing process for forming a synthetic coating layer to cover the outer-circumferential surface of the male spline section, while at the same time suppressing an increase in weight.

Means for Solving Problems

The inner shaft for an extendable and contractible shaft of the present invention has: a connecting rod section that is provided on the tip-end section of the inner shaft, and that has an outer diameter that is greater than that of the intermediate section and base-end section; a male spline section that is provided on the outer-circumferential surface of the connecting rod section; and a coating layer that is made of a synthetic resin such as polyamide resin (PA), polytetrafluoroethylene resin (PTFE), polyacetal resin (POM) and the like that is formed so as to cover the entire outer-circumferential surface of the male spline section.

Particularly, in the inner shaft for an extendable and contractible shaft of the present invention, the entire outer-circumferential surface of the male spline section is covered in the axial direction by the coating layer. Positioning means for positioning a cutting tool such as a shaping cutter, broach or the like in the circumferential direction during a finishing process of the coating layer is provided in one or more location in the circumferential direction of the outer-circumferential surface of the inner shaft for an extendable and contractible shaft, in a state in which at least part is located in a portion that is separated in the axial direction from the male spline section.

Preferably, the positioning means is constructed by a concave groove that extends in the axial direction parallel to the center axis of the inner shaft for an extendable and contractible shaft. In this case, at least part of the concave groove is located in a portion that is adjacent in the axial direction to the male spline section. Alternatively, the concave groove can be provided in a state so as to be continuous in the axial direction with a male spline groove of the male spline section that extends in the axial direction. In that case, the concave groove can be provided so that the length in the axial direction of the concave groove is longer than the length in the axial direction of the male spline groove. Moreover, preferably, the width of the groove bottom of the concave groove is less than the width of the tooth bottom of the male spline groove of the male spline section. In this case, preferably, the male spline section is formed by plural male spline teeth and male spline grooves that extend in the axial direction and that are continuously arranged in the circumferential direction in an alternating manner; the concave groove is formed making the tooth bottom of one or more male spline groove of the plural male spline grooves and a portion that is separated in the axial direction from the one or more male spline groove continuous; and the coating layer is shaped along the outer shape of the male spline teeth and male spline grooves in a state such that portion of the concave groove which is formed in the tooth bottom of the one or more male spline groove is embedded by the coating layer. Furthermore, in the case where the inner shaft for an extendable and contractible shaft has construction such as an intermediate shaft for a steering apparatus in which a yoke is provided on the base-end section, and particularly, when concave grooves are formed at positions that are shifted from each other in the circumferential direction by a phase of 180°, preferably the concave grooves are formed so that the phase of the concave grooves coincides with the phase of the yoke.

Moreover, in the extendable and contractible inner shaft of the present invention, preferably the number of positioning means (number of concave grooves) in the circumferential direction is a factor of two or more of the total number of male spline grooves of the male spline section.

In a manufacturing method of the inner shaft for an extendable and contractible shaft of the present invention, a connecting rod section is formed on the tip-end section of a metal raw material so that the outer diameter is larger than that of the intermediate section and base-end section, and a male spline section is provided on the outer-circumferential surface of the connecting rod section. Then, a resin layer is formed on the outer-circumferential surface of the male spline section by forming a synthetic resin coating to cover the entire outer-circumferential surface of the male spline section by means such as a fluidized bed coating method or a method of spraying synthetic resin. After that, a synthetic resin coating layer is formed on the outer-circumferential surface of the male spline section by performing a finishing process on the resin layer using a cutting tool to perform a cutting process such as a shaping process or broaching process for removing the excess portion.

Particularly, in the manufacturing method of the inner shaft for an extendable and contractible shaft of the present invention, a positioning means (a positioning concave section or convex section) is formed in at least one location in the circumferential direction of the outer-circumferential surface of the raw material so that at least part of the positioning means is located in a portion that is separated in the axial direction from the male spline section. Then, when performing the finishing process, the positioning means is able to perform positioning in the circumferential direction of a cutting tool such as a shaping cutter, broach or the like (align the phases in the circumferential direction of the male spline section and the cutting tool). Preferably, the raw material is selected from among a rod shaped member, circular column shaped material or a cylindrical material, and the male spline section is formed by performing plastic working on the connecting rod section.

Effect of Invention

With the inner shaft for an extendable and contractible shaft and the manufacturing method thereof of the present invention, it is possible to easily perform phase alignment in the circumferential direction of the male spline section and cutting tool when performing a finishing process for forming a synthetic resin coating layer on the outer-circumferential surface of the male spline section, while suppressing an increase in weight. In other words, during the finishing process, it is possible to perform positioning in the circumferential direction of the cutting tool (phase alignment of the male spline section and cutting tool) by using the portion of the positioning means that is formed on the outer-circumferential surface of the inner shaft for an extendable and contractible shaft that is located in a portion separated in the axial direction from the male spline section and not covered by the resin layer, so it is possible to easily position the cutting tool. Moreover, the male spline section does not need to be formed in the portion where there is no engagement with the female spline section of the outer shaft of the extendable and contractible shaft, so it is possible to prevent needless increase in weight of the inner shaft for extendable and contractible shaft.

BRIEF DESCRIPTION OF DRAWINGS

FIG. 4A and FIG. 4B are side views illustrating two examples of the formation position of a concave groove when the second example of an embodiment of the present invention is applied to the inner shaft of the intermediate shaft.

FIG. 5A is a view similar to FIG. 1B, and illustrates a third example of an embodiment of the present invention; and FIG. 5B is a view similar to FIG. 1C for this third example.

FIG. 6 is a view similar to FIG. 1B, and illustrates a fourth example of an embodiment of the present invention.

MODES FOR CARRYING OUT INVENTION

First Example

Figure 1:
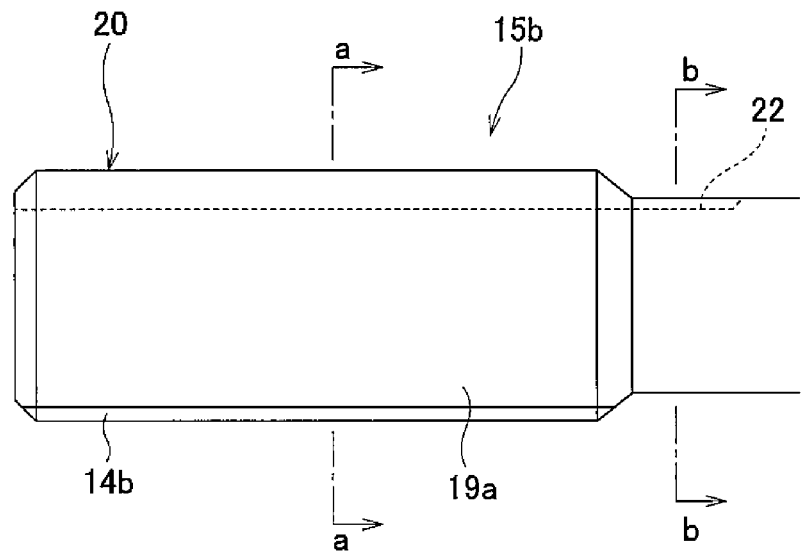
FIG. 1A is an enlarged side view illustrating a main part of a first example of an embodiment of the present invention.
FIG. 1B is a cross-sectional view of section a-a in FIG. 1A.
FIG. 1C is a cross-sectional view of section b-b in FIG. 1A.
Figure 1:
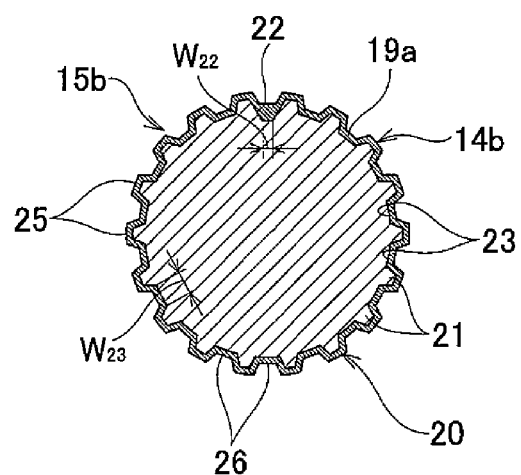
Figure 1:
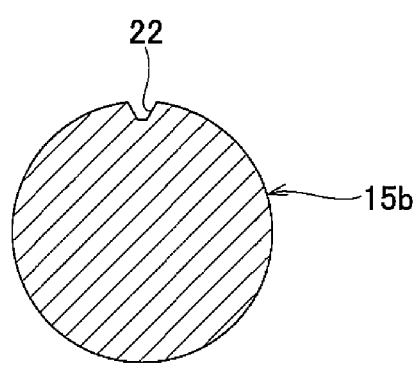
Figure 2:
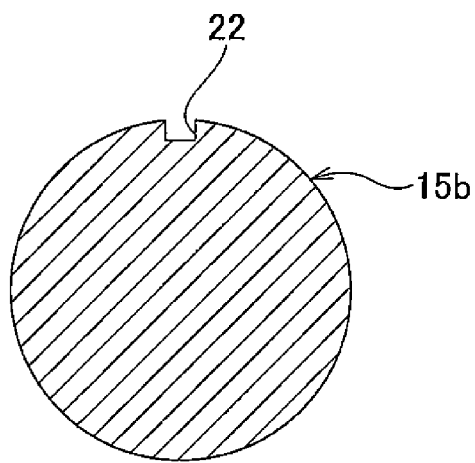
FIGS. 2A and 2B are views similar to FIG. 1C, and illustrate two other examples of a concave groove with different shapes.
Figure 2:
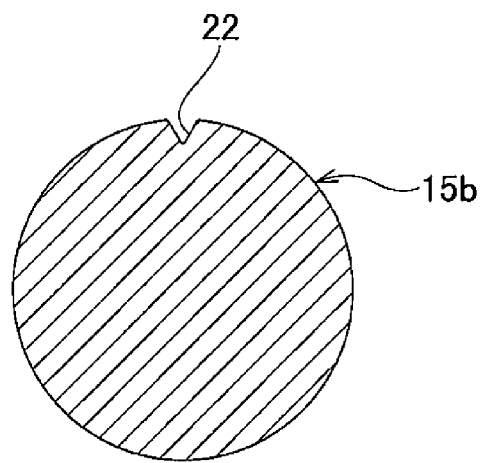
Figure 3A:
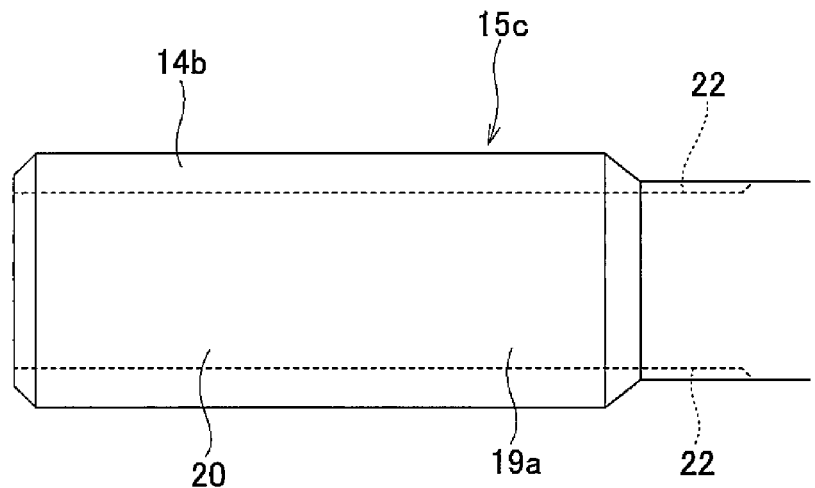
FIGS. 3A to 3C are views similar to FIGS. 1A to 1C, and illustrate a second example of an embodiment of the present invention.
Figure 3:
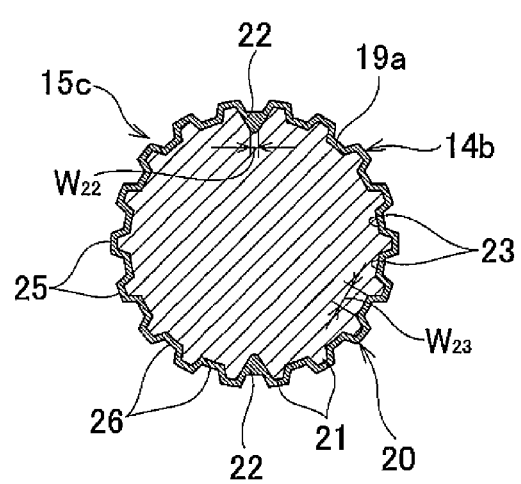
Figure 3:
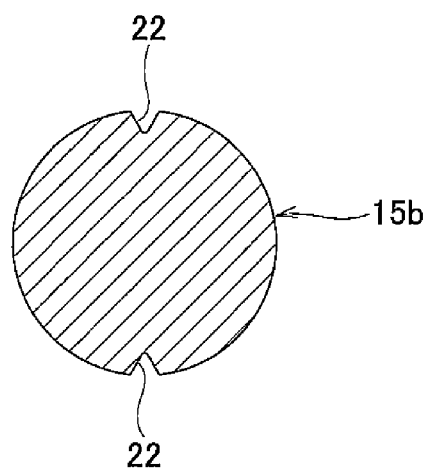

FIG. 1A to FIG. 2B illustrate a first example of an embodiment of the present invention. A feature of this example is the construction of an inner shaft for an extendable and contractible shaft and manufacturing method thereof in order to easily perform phase alignment of a male spline section 14$b$ and a cutting tool that is used in a finishing process when performing a finishing process of a synthetic resin layer that covers the outer-circumferential surface of the male spline section 14$b$ while suppressing an increase in weight. The construction and function of the other portions are the same as in the conventional construction.

The tip-end section (left-end section in FIG. 1) of the inner shaft 15$b$ of this example is constructed by a connecting-rod section 20 having an outer diameter that is larger than the base-end section and intermediate section of the inner shaft 15$b$, and a male spline section 14$b$ is provided around the outer-circumferential surface of the connecting-rod section 20. The male spline section 14$b$ is formed by arranging plural male spline teeth 21, which are parallel to the center axis of the inner shaft 15$b$ and extend along the axial direction of the connecting-rod section 20, at a uniform pitch in the circumferential direction. The tooth thickness and tooth depth of these male spline teeth 21 are fixed along the axial direction except in a chamfer section that is formed on the end edge in the axial direction of the connecting-rod section 20. Moreover, male spline grooves 23 are provided in portions between male splines 21 that are adjacent in the circumferential direction. In other words, the male spline section 14$b$ is formed by plural male spline teeth 21 and male spline grooves 23 that extend in the axial direction and are continuous in an alternating manner in the circumferential direction. A coating layer 19$a$ that has a uniform film thickness of about 10 μm to 1000 μm and surface roughness Ra of about 0.05 μm to 15 μm and that is made of a synthetic resin that slides easily (low coefficient of friction) such as polyamide resin (PA), polytetrafluoroethylene resin (PTFE), polyacetal resin (POM) and the like is formed over the entire outer-circumferential surface of the male spline section 14$b$. The coating layer 19$a$ has a shape that follows the outer shape of the male spline teeth 21 and male spline grooves 23, and is constructed by a male spline teeth section 25 and male spline groove section 26.

In this example, a concave groove 22 is provided in a portion of the outer-circumferential surface of the inner shaft 15$b$ where the phase in the circumferential direction coincides with one male spline groove 23, and covers a range that spans from the tip-end edge of the inner shaft 15$b$ to the intermediate section that is separated in the axial direction from the male spline section 14$b$, and this concave groove 22 corresponds to positioning means (positioning concave section). In other words, the concave groove 22 extends in the axial direction parallel to the center axis of the inner shaft 15b, and is longer than the male spline grooves 23. In this example, as illustrated in FIG. 1B and FIG. 1C, the cross-sectional shape of the concave groove 22 is a trapezoidal shape. However, the cross-sectional shape of the concave groove 22 could also be a rectangular shape as illustrated in FIG. 2A, or a triangular shape as illustrated in FIG. 2B. No matter which cross-sectional shape is used, it is preferred from the aspect of sufficiently maintaining resistance to breakage that the width ($W_{22}$) in the circumferential direction of the groove bottom of the concave groove 22 be less than the width ($W_{23}$) in the circumferential direction at the tooth bottom of the male spline groove 23. In this example, one concave groove 22 is formed by making the tooth bottom of one male spline groove 23 and a portion that is separated in the axial direction of that male spline groove 23 continuous. The coating layer 19a fills in the portion that is formed on the groove bottom of the male spline groove 23 of the concave groove 22, so the male spline teeth section 25 and male spline groove section 26 of the coating layer 19a has a shape that follows the outer shape of the male spline teeth 21 and male spline groove 23 in the case when there was no concave groove 22.

When producing the inner shaft 15b of this example, first, by performing a cutting process on the intermediate section and base-end section of a circular column shaped raw material that is made of metal such as carbon steel, the tip-end section of the raw material is formed into a connecting rod section 20 having an outer diameter that is greater than the intermediate section and the base-end section. Here, as the metal raw material, depending on the usage of the extendable and contractible shaft, it is also possible to use a rod shape material or cylindrical material instead of the circular column shaped member. A male spline section 14b is provided on the outer-circumferential surface of the connecting-rod section 20 by performing spline processing that uses plastic working such as cold forging, hob processing, component rolling or the like to form plural (18 in the example in the figure) male spline grooves 23 and plural male spline teeth 21. Furthermore, a concave groove 22 is provided in a portion of the outer-circumferential surface of the inner shaft 15b where the phase in the circumferential direction coincides with one of the male spline grooves 23, and extends in the axial direction in the range from the tip-end edge of the inner shaft 15b to the intermediate section that is separated in the axial direction from the male spline section 14b. The concave groove 22 is preferably formed at the same time as the male spline groove 23 by plastic working such as cold forging, hob processing, component rolling or the like. However, the concave groove 22 can also be formed by a cutting process after the male spline section 15b is provided.

In any case, after the concave groove 22 is provided on the outer-circumferential surface of the inner shaft 15b, a resin layer is formed in the male spline section 14b by using a fluidized bed coating method or a method of spraying to form a synthetic resin coating that slides easily (has a low coefficient of friction) on the outer-circumferential surface of the male spline section 14b. The intermediate raw material that is obtained in this way is held in the holder of a processing apparatus that is used for performing a finishing process on the resin layer by a cutting process such as a shaping process, broach process or the like. When doing this, the concave groove 22 is used for positioning the cutting tool that is used for the cutting process in the circumferential direction, or in other words, by causing the concave groove to engage with part of the holder, or by detecting the concave groove 22 visually or with a sensor, the phases in the circumferential direction of the unevenness in the circumferential direction of the male spline section 14b and the cutting tool such as a shaping cutter, broach or the like can be aligned, and the intermediate raw material is held in the holder of the processing apparatus. Then, by performing a finishing process on the synthetic layer by cutting away and removing excess portions using a cutting tool such as a shaping cutter, broach or the like, an inner shaft 15b is obtained on which a coating layer 19a having a male spline teeth sections 25 and male spline groove section 26s is formed over the entire outer-circumferential surface of the male spline section 14b. The coating layer 19a has a uniform thickness except in the portion that covers the bottom surface of the concave groove 22, and has good surface roughness.

With the inner shaft 15b of this example, it is possible to easily perform phase alignment in the circumferential direction of the male spline section 14b and the cutting tool for the finishing process while suppressing an increase in weight, as well as it is possible to easily form a synthetic resin coating layer 19a on the outer-circumferential surface of the male spline section 14b that has a uniform film thickness and good surface roughness. In other words, phase alignment in the circumferential direction of the male spline section 14b and the cutting tool when performing a finishing process of cutting away and removing excess portions of the resin layer that covers the outer-circumferential surface of the male spline section 14b can be performed easily by using the portion of the concave groove 22 that is separated in the axial direction from the male spline section 14b. Moreover, in this example, the concave groove 22 is provided up to a portion of the outer-circumferential surface of the inner shaft 15b that is separated in the axial direction from the male spline section 14b. Therefore, there is no need to form the male spline section 14b up to a portion where there is no engagement with the female spline section of the outer shaft in order to perform phase alignment in the circumferential direction of the male spline section 14b and the cutting tool. Consequently, it is possible to prevent an unnecessary increase in weight of the inner shaft 15b. Furthermore, by forming the concave groove 22, it is also possible to reduce the weight of the inner shaft 15b.

In this example, as positioning means, instead of the concave groove 22, it is also possible to provide a positioning convex section for performing phase alignment in the circumferential direction of the male spline section 14b of the extendable and contractible inner shaft 15b and a cutting tool on the outer-circumferential surface of the extendable and contractible inner shaft 15b in a state such that at least part of that positioning convex section is located in a portion that is separated in the axial direction from the male spline section 14b. In this case, the positioning convex section can be provided in a state so as to be continuous in the axial direction with a male spline tooth 21 of the male spline section 14b.

Second Example

FIG. 3A to FIG. 4B illustrate a second example of an embodiment of the present invention. In this example, concave grooves 22 are provided at two locations on opposing sides in the radial direction of the outer-circumferential surface of the tip-end section and intermediate section of the inner shaft 15c in a state so as to be continuous in the axial direction with male spline grooves 23 at two locations on opposing sides in the radial direction. Moreover, in this example, the number of concave grooves 22 is two, which is a factor of two or more of the total number (18 in the example in the figure) of mail spline grooves 23. Therefore, the shape of the tip-end section of the inner shaft 15c can be symmetrical in the circumferential direction, so when processing the concave grooves 22, it is possible to prevent deformation such as bending from occurring.

In this example as well, the width ($W_{22}$) in the circumferential direction of the groove bottom of the concave grooves 22 is preferably less than the width ($W_{23}$) in the circumferential direction at the tooth bottom of each of the male spline grooves 23 of the male spline section 14b ($W_{22} < W_{23}$). By arranging the two concave grooves 22 so as to face each other by a 180° phase shift, and by making the width ($W_{22}$) of the concave grooves 22 less than the width ($W_{23}$) at the tooth bottom of each of the male spline grooves 23 ($W_{22} < W_{23}$), there is no breakage in the axial direction of the inner shaft 15c even when the extendable and contractible shaft is fatigued due to receiving continuous or repeated stress from use, or when a large torque is suddenly applied to the extendable and contractible shaft; and at first, cracking occurs inside the inner shaft 15c in the radial direction between the two concave sections 22 in a range in the axial direction where the concave grooves 22 are located. In a state in which this kind of cracking occurs, abnormality such as looseness occurs when the extendable and contractible shaft is used, so it is possible for the operator of a steering apparatus having this kind of extendable and contractible shaft to easily detect abnormality. Moreover, the inner shaft 15c does not break in the axial direction, so even in a case such as this, torque can be transmitted by the extendable and contractible shaft.

Figure 10:
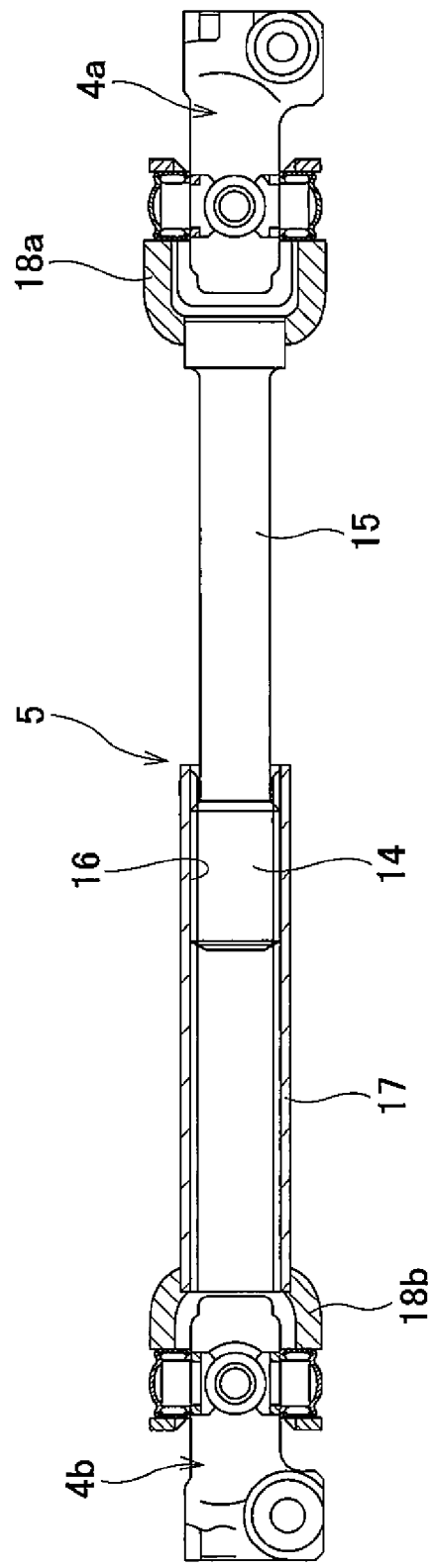
FIG. 10 is a partial cross-sectional side view illustrating the intermediate shaft that has been removed from the steering apparatus in FIG. 9.
Figure 11:
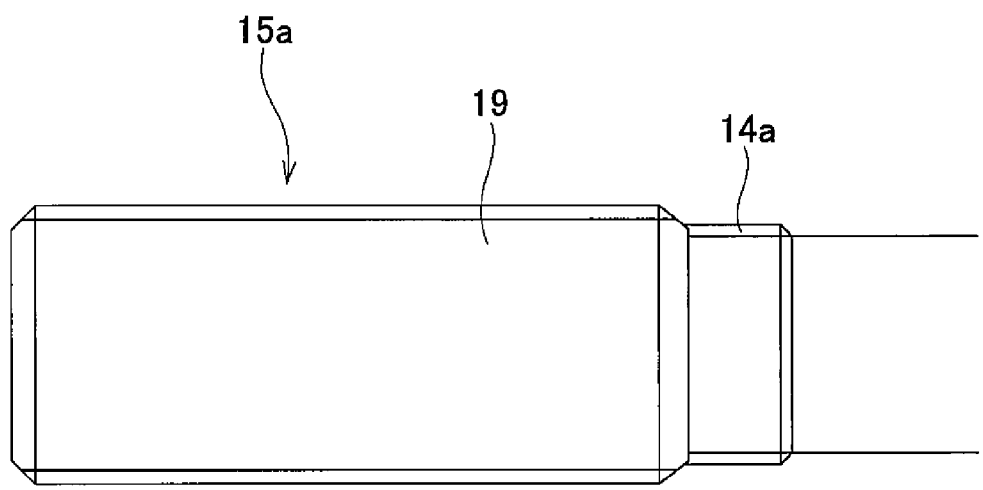
FIG. 11 is an enlarged side view for explaining an example of conventional construction for aligning the phase in circumferential direction of the male spline section of the inner shaft and a cutting tool.

When the inner shaft 15c of this example is applied as the intermediate shaft 5 of a steering apparatus, or in other words, when a yoke 18a is provided on the base-end section 27 of the inner shaft 15c, the position of formation in the circumferential direction of the concave grooves 22 is arbitrary, however, rather than forming the concave grooves 22 so that the phase differs from that of the yoke 18a by 90.degree. as illustrated in FIG. 4A, forming the concave grooves 22 so that the phase coincides with that of the yoke 18a as illustrated in FIG. 4B is preferred. When torque is inputted to the intermediate shaft 5, torque is applied in the direction of rotation, as well as a moment is applied to the intermediate shaft 5 in the direction of formation of the yoke 18a (up-down direction in FIG. 4 and FIG. 10) in a direction that would cause the intermediate shaft 5 to oscillate and bend. When the concave grooves 22 are arranged as illustrated in FIG. 4A, the concave grooves 22 are easily affected by the torque and moment described above, and it becomes easy for cracking to occur in the inner shaft 15c starting at concave grooves 22. When the concave grooves 22 are arranged as illustrated in FIG. 4B, it becomes difficult for the concave grooves 22 to be affected by the moment described above, and are only affected by the torque, so it is possible to avoid problems due to cracking and the like, and it becomes easier to design a strong inner shaft 15c. Therefore, preferably the concave grooves 22 are formed so that the phase of the concave grooves 22 and that of the yoke 18a coincide. This aspect can also be applied to the case in which a concave groove 22 is provided at only one location in the circumferential direction as in the first example of an embodiment. The construction and function of the other parts are the same as in the first example of an embodiment.

Third Example

FIG. 5A and FIG. 5B illustrate a third example of an embodiment of the present invention. In this example, concave grooves 22 are provided at three locations in the circumferential direction of the outer-circumferential surface of the tip-end section and intermediate section of the inner shaft 15d so as to be uniformly spaced with respect to each other, and so that each is continuous in the axial direction with a male spline groove 23 of the male spline section 14b. In other words, in this example as well, the number of concave grooves 22 is taken to be a factor (3) of the total number (18 grooves) of male spline grooves. The construction and functions of the other parts are the same as in the second example of an embodiment.

Fourth Example

FIG. 6 illustrates a fourth example of an embodiment of the present invention. In this example, concave grooves 22a are formed at three locations on the outer-circumferential surface of the inner shaft 15 in portions that are adjacent in the axial direction to the male spline section 14b so as to be uniformly spaced with respect to each other. Moreover, the concave grooves 22a are formed so that the phase in the circumferential direction is shifted from that of the male spline grooves 23 of the male spline section 14b (shifted the amount of ¼ of the pitch in the example in the figure). The construction and functions of the other parts are the same as in the third example of an embodiment.

Fifth and Sixth Examples

Figure 7:
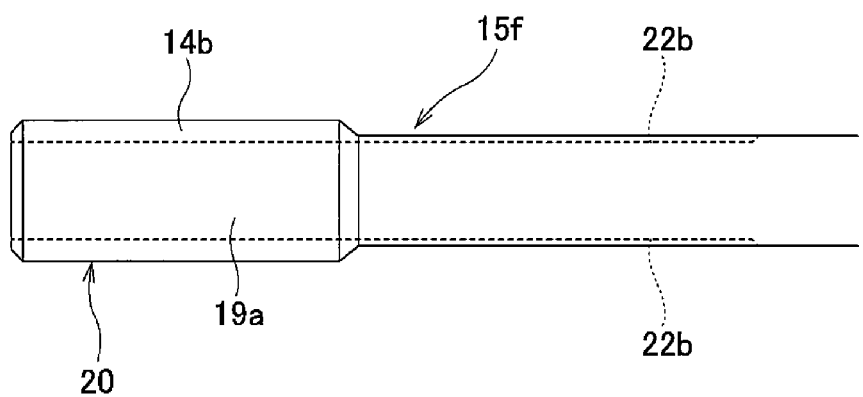
FIG. 7A is an enlarged side view illustrating a main part of a fifth example of an embodiment of the present invention.
FIG. 7B is an enlarged side view illustrating a main part of a sixth example of an embodiment of the present invention.
Figure 7:
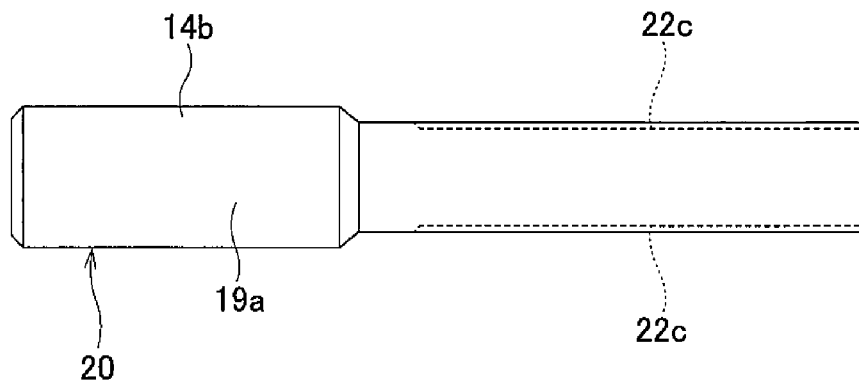

FIG. 7A illustrates a fifth example of an embodiment of the present invention, and FIG. 7B illustrates a sixth example of an embodiment of the present invention. In the case of the fifth example illustrated in FIG. 7A, the concave grooves 22b are formed in portions of the outer-circumferential surface of the inner shaft 15f that extend from the tip-end edge to portions near the base end. In other words, the length in the axial direction of the concave grooves 22b is longer than the concave grooves 22 of the first example and second example of an embodiment. On the other hand, in the case of the sixth example illustrated in FIG. 7B, the concave grooves 22c are formed in portions of the outer-circumferential surface of the inner shaft 15g that are separated in the axial direction from the male spline section 14b and extend from the intermediate section to near the base-end section. The construction and functions of the other parts are the same as in the first to third examples of an embodiment.

Seventh Example

Figure 8:
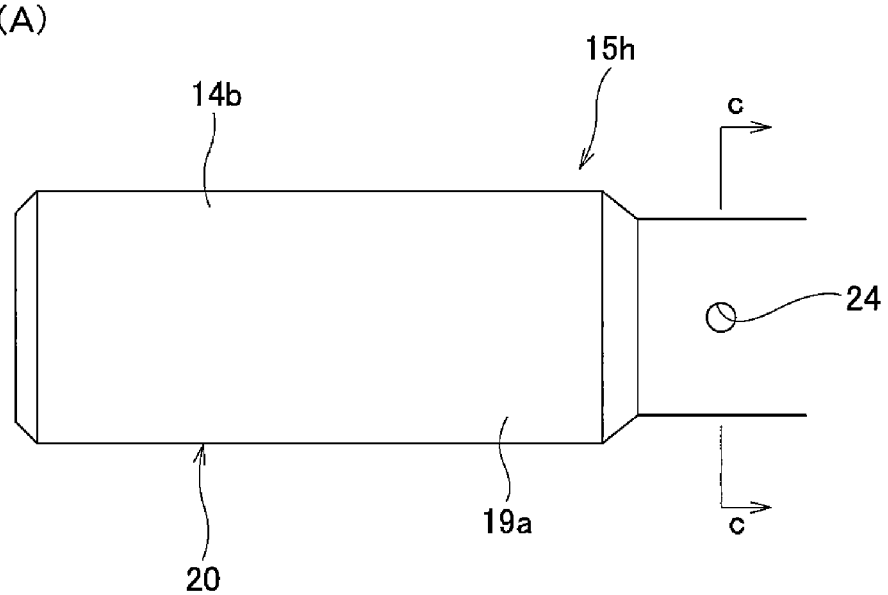
FIG. 8A is an enlarged side view illustrating a main part of a seventh example of an embodiment of the present invention.
FIG. 8B is a cross-sectional view of section c-c in FIG. 8A.
Figure 8:
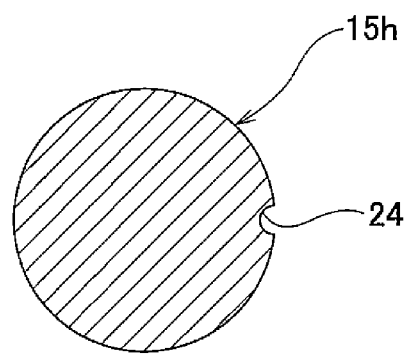
Figure 9:
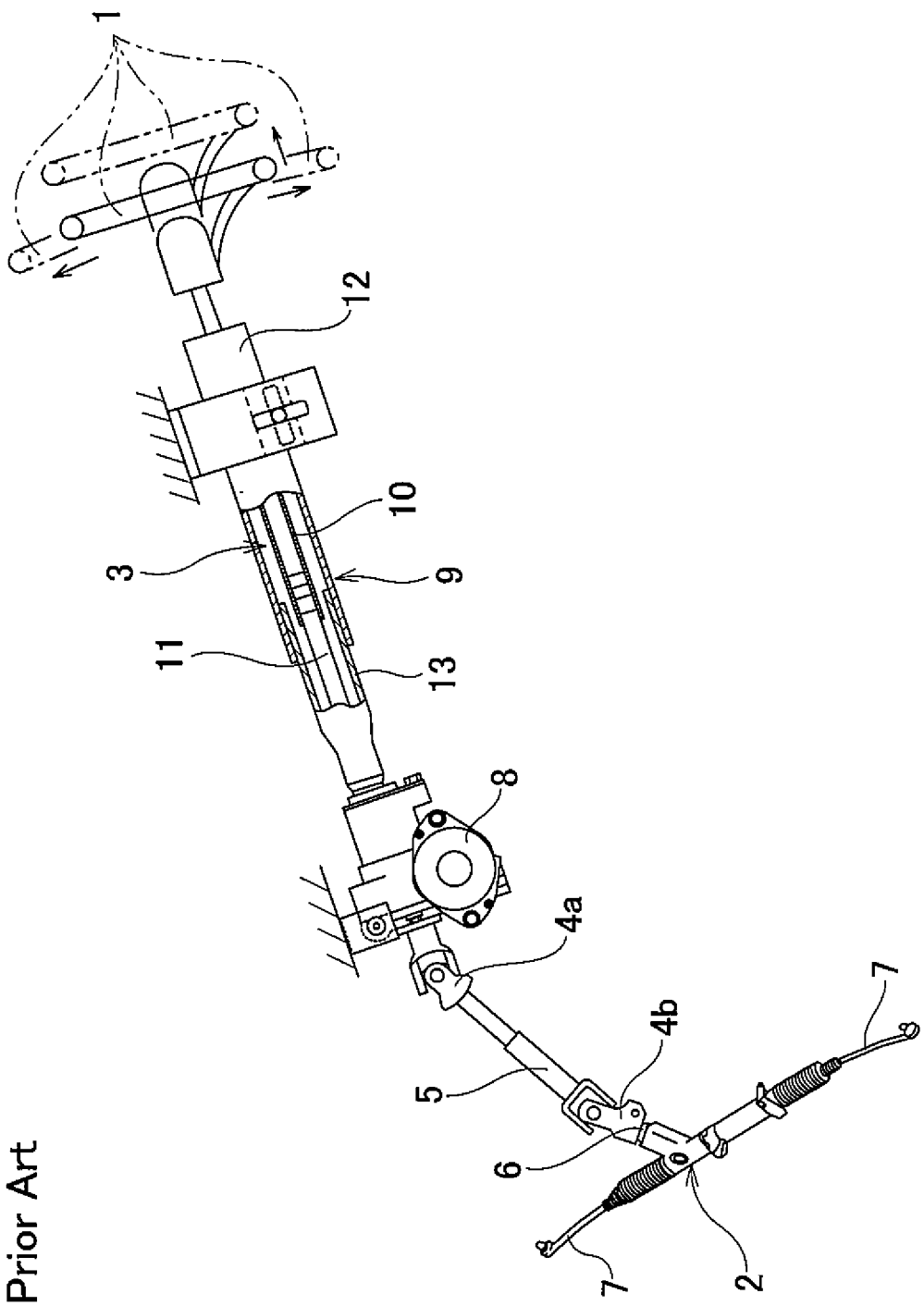
FIG. 9 is a partial cross-sectional side view illustrating an example of a conventional steering apparatus.

FIG. 8A and FIG. 8B illustrate a seventh example of an embodiment of the present invention. In this example, a semi-spherical concave section 24 that corresponds to a positioning concave section is provided on the outer-circumferential surface of the inner shaft 15 in the intermediate section separated in the axial direction from the male spline section 14b. As long as it is possible to perform positioning in the circumferential direction of the male spline section and cutting tool, the shape of the concave section 24 is arbitrary and not limited to a semi-spherical shape. Moreover, the number of concave sections 24 in the circumferential direction can be one as in the example in the figure, or can be more than one, and preferably is a factor of two or more of the total number of the male spline grooves 23 (refer to FIG. 1). Furthermore, in the example in the figure, the concave section 24 is provided at one location in the axial direction, however, it is also possible to provide concave sections 24 at two or more locations that are separated in the axial direction. In this example as well, instead of a semi-spherical concave section 24, it is also possible to provide a semi-spherical convex section. The construction and functions of the other parts are the same as in the first example and second example of an embodiment.

INDUSTRIAL APPLICABILITY

The present invention can be widely applied to an inner shaft of an extendable and contractible shaft of a steering shaft, intermediate shaft or the like of an automobile steering apparatus.

EXPLANATION OF REFERENCE NUMBERS

1 Steering wheel
2 Steering gear
3 Steering shaft
4a, 4b Universal joint
5 Intermediate shaft
6 Input shaft
7 Tie rod
8 Electric motor
9 Steering column
10 Outer shaft
11 Inner shaft
12 Outer column
13 Inner column
14, 14a, 14b Male spline section
15, 15a to 15h Inner shaft
16 Female spline section
17 Outer shaft
18a, 18b Yoke
19, 19a Coating layer
20 Connecting rod section
21 Male spline teeth
22, 22a to 22c Concave groove
23 Male spline groove
24 Concave section
25 Male spline teeth section
26 Male spline groove section

What is claimed is:
1. An inner shaft for an extendable and contractible shaft, the inner shaft comprising:
a connecting rod section provided on a tip-end section of the inner shaft, and having an outer diameter that is greater than an outer diameter of an intermediate section and a base-end section of the inner shaft;
a male spline section provided on an outer-circumferential surface of the connecting rod section;
a synthetic resin coating layer formed to entirely cover the male spline section; and
a positioning means provided in one or more location in a circumferential direction of an outer-circumferential surface of a portion that is separated in an axial direction from the male spline section of the inner shaft, the positioning means being used for positioning a cutting tool for forming the coating layer in the circumferential direction during a finishing process, wherein
the positioning means is a concave groove that extends in the axial direction, and
at least part of the concave groove is located in a portion that is adjacent in the axial direction to the male spline section.

2. The inner shaft for an extendable and contractible shaft according to claim 1, wherein
the concave groove is provided in a state so as to be continuous in the axial direction with a male spline groove of the male spline section that extends in the axial direction.
3. The inner shaft for an extendable and contractible shaft according to claim 2, wherein
a length in the axial direction of the concave groove is longer than a length in the axial direction of the male spline groove.
4. The inner shaft for an extendable and contractible shaft according to claim 1, wherein
a width of a groove bottom of the concave groove is less than a width at a tooth bottom of a male spline groove of the male spline section.
5. The inner shaft for an extendable and contractible shaft according to claim 4, wherein
the male spline section comprises plural male spline teeth and male spline grooves that extend in the axial direction and that are continuously arranged in the circumferential direction in an alternating manner;
the concave groove is formed by making the tooth bottom of one or more male spline groove of the plural male spline grooves and a portion that is separated in the axial direction from the one or more male spline groove continuous; and
the coating layer is shaped along an outer shape of the male spline teeth and male spline grooves in a state such that a portion of the concave groove which is formed in the tooth bottom of the one or more male spline groove is embedded by the coating layer.
6. The inner shaft for an extendable and contractible shaft according to claim 1, wherein
a yoke is provided on the base-end section, and the concave groove is formed so that the phase of the concave groove coincides with the phase of the yoke.
7. The inner shaft for an extendable and contractible shaft according to claim 1, wherein
a number of the positioning means in the circumferential direction is a factor of two or more of a total number of male spline grooves of the male spline section.
8. A manufacturing method for an inner shaft for an extendable and contractible shaft,
the inner shaft comprising:
a connecting rod section provided on a tip-end section of the inner shaft, and having an outer diameter that is greater than an outer diameter of an intermediate section and a base-end section of the inner shaft;
a male spline section provided on an outer-circumferential surface of the connecting rod section;
a synthetic resin coating layer formed to entirely cover the male spline section; and
a positioning means provided in one or more location in a circumferential direction of an outer-circumferential surface of a portion that is separated in an axial direction from the male spline section of the inner shaft, the positioning means being used for positioning a cutting tool for forming the coating layer in the circumferential direction during a finishing process,
wherein the positioning means is a concave groove that extends in the axial direction, and at least part of the concave groove is located in a portion that is adjacent in the axial direction to the male spline section,
the method comprising steps of:
forming a connecting rod section on a tip-end section of a metal raw material so that an outer diameter of the connecting rod section is larger than an outer diameter of an intermediate section and a base-end section of the metal raw material;
forming a male spline section on an outer-circumferential surface of the connecting rod section;
forming positioning means in at least one location in a circumferential direction on an outer-circumferential surface of the raw material so that at least part of the positioning means is located in a portion that is separated in an axial direction from the male spline section;
forming a resin layer by forming a synthetic resin coating to entirely cover the male spline section;
performing positioning in the circumferential direction of a cutting tool by the positioning means;
performing a finishing process on the resin layer using the cutting tool for removing an excess portion of the resin layer to form a synthetic resin coating layer on the outer-circumferential surface of the male spline section.

9. The manufacturing method for an inner shaft for an extendable and contractible shaft according to claim 8, wherein
a rod shaped material, circular column shaped material or a cylindrical material is used as the metal raw material, and the male spline section is formed by performing plastic working on the connecting rod section.

* * * * *